United States Patent [19]
Orlando

[11] 4,089,016
[45] May 9, 1978

[54] RAPID ACCESS DRY PHOTOGRAPHIC SYSTEM

[75] Inventor: Carl Orlando, Tinton Falls, N.J.

[73] Assignee: The United States of America as represented by the Secretary of the Army, Washington, D.C.

[21] Appl. No.: 742,969

[22] Filed: Nov. 17, 1976

[51] Int. Cl.² .................................. G03B 17/50
[52] U.S. Cl. ............................ 354/75; 354/83; 354/202; 354/354; 250/213 VT
[58] Field of Search ............... 354/75, 76, 83, 202, 354/299, 354, 297; 355/1, 133; 250/213 R, 213 VT

[56] References Cited

U.S. PATENT DOCUMENTS

| | | | |
|---|---|---|---|
| 3,577,898 | 5/1971 | Bragg | 354/202 |
| 3,585,917 | 6/1971 | Griffith | 354/297 |
| 3,719,823 | 3/1973 | Sheldon | 250/213 VT |
| 3,752,983 | 8/1973 | Yanez | 250/213 R |
| 3,809,888 | 5/1974 | Stock et al. | 250/213 R |
| 3,823,413 | 7/1974 | Cole | 355/133 |
| 3,980,880 | 9/1976 | Agostino | 250/213 VT |

*Primary Examiner*—L. T. Hix
*Assistant Examiner*—Alan Mathews
*Attorney, Agent, or Firm*—Nathan Edelberg; Sheldon Kanars; Edward Goldberg

[57] ABSTRACT

A system for increasing the relative sensitivity of a photographic system using dry silver emulsion film. Two concepts are combined to obtain the required sensitivity for dry film material. First an image intensifier tube is used to collect and amplify the light from the target to be photographed with the phosphor anode of the tube being coupled to the dry silver film by means of a fiber optics face plate. Secondly, photon amplification is additionally used to enhance the sensitivity of the dry silver emulsion, by illuminating the photo-cathode or the film itself at the time of exposure with a uniform low intensity non-imaging light.

11 Claims, 4 Drawing Figures

U.S. Patent  May 9, 1978  4,089,016
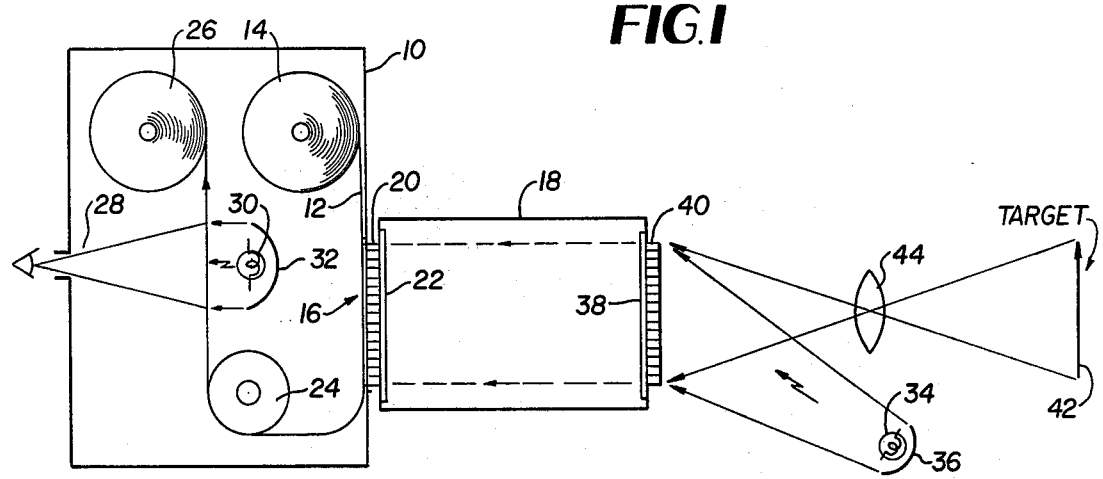
FIG.1
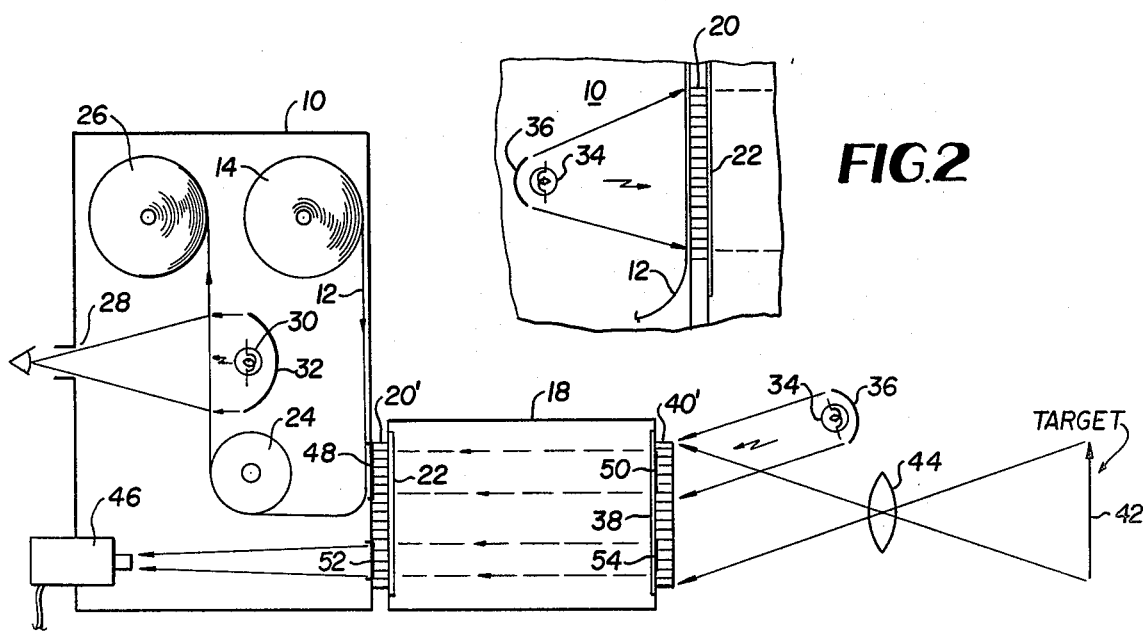
FIG.2
FIG.3
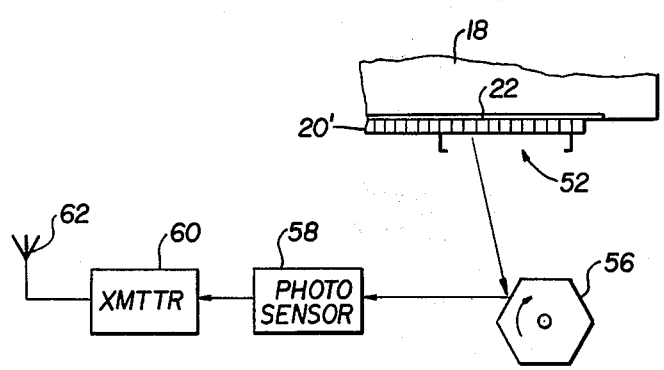
FIG.4

RAPID ACCESS DRY PHOTOGRAPHIC SYSTEM

The invention described herein may be manufactured and used by or for the Government for governmental purposes without the payment of any royalties thereon or therefor.

BACKGROUND OF THE INVENTION

This invention relates generally to the field of photography and more particularly to a photographic system for producing rapid access dry photographic imagery shortly after making the exposure.

Photographic apparatus utilizing image intensifier tubes for making photographs under low light level conditions is well known, and is particularly useful for reconnaissance and surveillance systems having military applications. Such systems operate with relatively short exposure times and as a result require film having photographic emulsions which require a "wet" processing technique to make the latent image visible. Emulsions that do not require wet processing are not presently sufficiently sensitive for use.

Accordingly, it is an object of the subject invention to provide a system for producing real time high resolution hard copy photographic images with dry emulsion film suitable for immediate transmission and one which may be utilized for either day or night operation, stereo image capability, and one which is sensitive to both visible and covert e.g. near IR radiation and color or camouflage color.

SUMMARY

This invention is directed to an improvement in low light level photography wherein image intensification is utilized and includes means to enhance the sensitivity of a dry emulsion film optically coupled to the anode of an image intensifier tube by illuminating the photographic image either at the photo-cathode or anode at the time of exposure with a uniform low intensity non-imaging light.

BRIEF DESCRIPTION OF THE DRAWINGS

FIG. 1 is a system block diagram of a rapid access drive photgraphic system according to a first embodiment of the subject invention;

FIG. 2 is a fragmentary view illustrative of a modification of the embodiment shown in FIG. 1;

FIG. 3 is a system block diagram illustrative of a second embodiment of the subject invention; and FIG. 4 is a fragmentary view illustrative of a modification of the embodiment shown in FIG. 3.

DESCRIPTION OF THE PREFERRED EMBODIMENTS

Referring now to the drawings and more particularly to the block diagram of FIG. 1, reference numeral 10 is directed to a photographic camera film magazine having a dry silver emulsion film 12 included therein which is adapted to be unwound from a reel or spool 14 where it passes an aperture 16 optically coupled to an electronic image intensifier tube 18 by means of a fiber-optic face plate 20 which is adapted to couple an image appearing on a phosphor anode 22 to the film 12. The film 12 is typically a dry silver film such as marketed by the 3M Corporation as type 7859. The exposed film is processed by a hot processing roller 24 where it is then wound upon a second reel or spool 26. The processed image is adapted to be viewed by means of a second aperture 28 placed in front of the film 12 following its leaving the hot processing roller 24. The image can be viewed in approximately 4 to 8 seconds by the use of backlight illumination provided by a lamp 30 and a reflector 32 positioned behind the film 12 and projecting toward the aperture 28.

In order to increase the sensitivity for the dry silver film 12 which is approximately 100 times less sensitive than normal films, i.e. film having "wet" emulsions, photon amplification is provided in addition to the image intensifier action achieved by means of the image intensifier tube 18. Photon amplification is accomplished by illuminating the image at the time of exposure with a uniform non-imaging low intensity light. In the embodiment shown in FIG. 1, this is accomplished by directing a low light level source 34 including a reflector 36 to the photo-cathode 38 of the image intensifier tube 18 by means of a second fiber optic face plate 40, which is also adapted to receive the light image of the target 42 from an optical lens system 44. The intensity of the low level light source 34 should be approximately 1/10 to 1/100 of the light intensity coming through the lens system 44 from the target. This combination of image intensifier and photo amplification produces the required effect to expose the dry silver film 12 at approximately the same light intensity of the target as necessary by conventional photographic film.

Instead of placing the low level light source 34 in front of the photo-cathode 38 as shown in FIG. 1, a modification may be resorted to as shown in FIG. 2 wherein the low level source 34 is placed inside of the camera film magazine 10 in back of the dry silver film 12 as it receives the image from the anode 22 transmitted through the fiber optics face plate 20.

It should be pointed out in connection with the system such as shown in FIGS. 1 and 2 that the target 42 is illuminated with conventional illumination, i.e. daytime or artificial light, and the fiber optics face plates 20 and 40 provide efficient transfer of the light energy to and from the image intensifier tube 18. Color photography can be additionally attainable by the use of coded fringe interference techniques well known to those skilled in the art, which for example would include an encoding filter, not shown, placed intermediate the fiber optics plate 40 and the lens 44.

Referring now to FIG. 3, there is shown an embodiment which additionally allows real time electronic transmission of the target being photographed. The embodiment shown in FIG. 3 uses a portion of the image transmitted by the image intensifier tube 18 for hard copy imagery in the manner as set forth with respect to the embodiment shown in FIG. 1 while using another portion of the image transmitted to be coupled to a TV type camera 46 which is coupled to electronic signal transmission means, not shown. Modified fiber optics face plates 20' and 40' are utilized, each having strip photography slits 48 and 50 as well as suitably oriented adjacent slits 52 and 54 with the TV camera focused on the slit 52. In order to fully photograph the target 42, relative movement is required. Thus where the apparatus is mounted on an aircraft, the movement of the aircraft will accomplish the desired function. The velocity of the film 12 is additionally proportioned to the velocity/altitude of the aircraft resulting in a continuous photographic strip of the scene such as the terrain over which the aircraft moves while simultaneously a radio transmission of the image of the target observed is provided on a real time basis.

A modification of the embodiment shown in FIG. 3 is shown in FIG. 4 wherein the TV camera 46 is replaced by a scanning device including a rotating prism 56 which is coupled to a photosensor assembly 58 which provides electrical signals corresponding to the light modulation detected. These electrical signals are coupled to radio transmitter means 60 coupled to an antenna 62 for transmission of the signal to a remote station. The rotating prism arrangement shown in FIG. 4 has the advantage of providing imagery of a very high resolution.

It should be pointed out that the foregoing description of the preferred embodiments has been set forth by way of illustration only and is not meant to be interpreted in a limiting sense, since other modifications not shown may be resorted to without departing from the spirit and scope of the invention as set forth in the following claims. For example, light photography can be achieved using conventional illumination such as electronic flash apparatus. The light energy required using presently available dry silver material is the same magnitude employed for conventional photographic film. Capability for stereo images of the target 42 for the embodiment shown in FIG. 1 can be obtained by normal 60% overlap photography. For the embodiment shown in FIG. 3, however, stereo can be obtained by viewing as stereo pairs, the strip photograph obtained from the output of the slit image intensifier and the image transmitted. Visible radiation or IR photography is obtained by a suitable choice of the photo-cathode 38. For instance, gallium arsenide may provide acceptable results, both in the near IR and visible regions. Additionally as noted above, color and camouflage color photography may be obtained by using coded fringe interference photography. Accordingly,

I claim:

1. Apparatus for producing rapid access dry photography imagery on dry emulsion photographic film, wherein the improvement comprises:
   a film magazine having an image aperture adapted to receive an image of the target being photographed and including means for moving said film past said aperture for making a photographic exposure;
   a lens directing light from said target toward said aperture;
   image intensifier means optically coupled to said aperture being operative to collect and amplify light received from said target and lens to provide an intensified image to said aperture; and
   means impinging a relatively low light level uniform non-imaging light energy on said film at the time the exposure is made, the intensity of said low light level energy being 1/10 to 1/100th of the light intensity through said lens from said target thereby providing photon amplification, the combination of image intensification and photon amplification enhancing the relative sensitivity of said dry emulsion film to that of a wet emulsion film.

2. The apparatus as defined by claim 1 wherein said image intensifier means comprises an electronic image intensifier tube including a photo-cathode adapted to collect light from said target and an anode providing a relatively brighter image of said target to said aperture.

3. The apparatus as defined by claim 2 wherein said means impinging low level light energy comprises a relatively low light level non-imaging light source including a reflector located in front of and directing light energy to said photo-cathode.

4. The apparatus as defined by claim 2 wherein said means impinging said low level light energy comprises a low level non-imaging light source including a reflector located behind said film in said magazine and directing non-imaging light energy towards said aperture.

5. The apparatus as defined by claim 2 and additionally including fiber optics coupling means located between said aperture and said anode of said image intensifier tube.

6. The apparatus as defined by claim 5 and additionally including fiber optic coupling means located adjacent said photo-cathode of said image intensifier tube.

7. The apparatus as defined by claim 2 and additionally including film processing means located in said film magazine and viewing means in said magazine for viewing said film following film processing by said processing means.

8. The apparatus as defined by claim 7 wherein said film processing means comprises heat processing means.

9. The apparatus as defined by claim 2 wherein said film magazine includes another aperture adapted to receive an image of the target being photographed, and means directed to said another aperture for generating an electronic image on a real time basis of the target being photographed.

10. The apparatus as defined by claim 9 wherein said means for generating electronic image comprises a TV type camera focused on said another aperture.

11. The apparatus as defined by claim 9 wherein said means for generating said electronic image comprises a rotating prism coupled to said another aperture.

* * * * *